(12) United States Patent
Rasbach

(10) Patent No.: US 8,905,386 B2
(45) Date of Patent: Dec. 9, 2014

(54) THREE-STAGE CONCENTRIC COIL SPRING SYSTEM

(75) Inventor: Adam G. Rasbach, Orion, MI (US)

(73) Assignee: Chrysler Group LLC, Auburn Hills, MI (US)

(*) Notice: Subject to any disclaimer, the term of this patent is extended or adjusted under 35 U.S.C. 154(b) by 116 days.

(21) Appl. No.: 13/301,135

(22) Filed: Nov. 21, 2011

(65) Prior Publication Data
US 2013/0127101 A1    May 23, 2013

(51) Int. Cl.
*B60G 11/14* (2006.01)
*B60G 9/00* (2006.01)
*B60G 11/15* (2006.01)
*F16F 3/04* (2006.01)

(52) U.S. Cl.
CPC *B60G 9/00* (2013.01); *B60G 11/15* (2013.01); *F16F 3/04* (2013.01); *B60G 2202/12* (2013.01)
USPC .......................................... 267/290; 267/168

(58) Field of Classification Search
USPC ............ 267/290, 91, 92, 148, 155–157, 166, 267/168, 289
See application file for complete search history.

(56) References Cited

U.S. PATENT DOCUMENTS

| | | | | |
|---|---|---|---|---|
| 190,582 | A * | 5/1877 | Hansell | 267/4 |
| 1,934,579 | A * | 11/1933 | Wine | 267/4 |
| 2,643,109 | A * | 6/1953 | Wood | 267/180 |
| 4,148,469 | A * | 4/1979 | Geyer | 267/4 |
| 4,186,914 | A | 2/1980 | Radwill et al. | |
| 4,333,403 | A * | 6/1982 | Tack et al. | 105/197.05 |
| 4,907,788 | A * | 3/1990 | Balsells | 267/168 |
| 5,482,261 | A * | 1/1996 | Ortega | 267/168 |
| 5,868,383 | A * | 2/1999 | Codos | 267/80 |
| 7,731,562 | B2 * | 6/2010 | Huber | 446/486 |
| 7,954,436 | B2 * | 6/2011 | Gorski et al. | 105/218.1 |
| 2007/0013161 | A1 | 1/2007 | Rhein | |
| 2009/0031918 | A1 * | 2/2009 | Hewitt et al. | 105/198.2 |

* cited by examiner

*Primary Examiner* — Pamela Rodriguez
(74) *Attorney, Agent, or Firm* — Ralph E Smith

(57) ABSTRACT

A spring system that includes at least an inner spring and an outer spring disposed around the inner spring. The inner spring exhibits a stiffness (k1) and the outer spring exhibits a stiffness (k2) in an uncompressed state. The inner spring exhibits a stiffness (k3) and the outer spring exhibits the stiffness (k2) in an intermediate compressed state, and the inner spring exhibits the stiffness (k3) and the outer spring exhibits a stiffness (k4) in a fully compressed state. In this manner, the spring system of the present disclosure may provide a vehicle with variable rates of compression that assist in providing a smooth ride at lower loads or jounce levels.

6 Claims, 8 Drawing Sheets

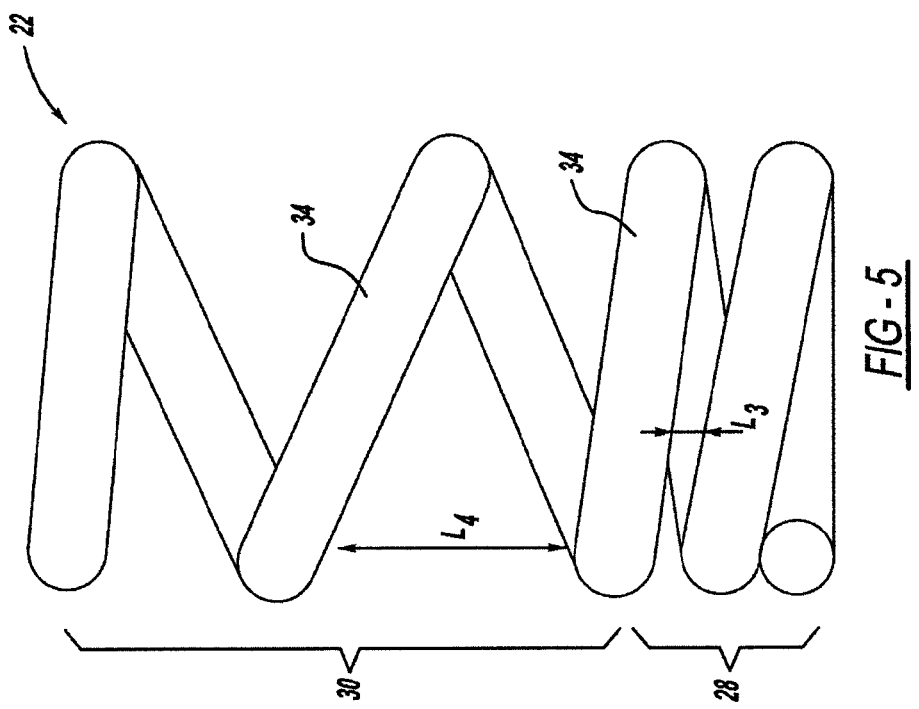
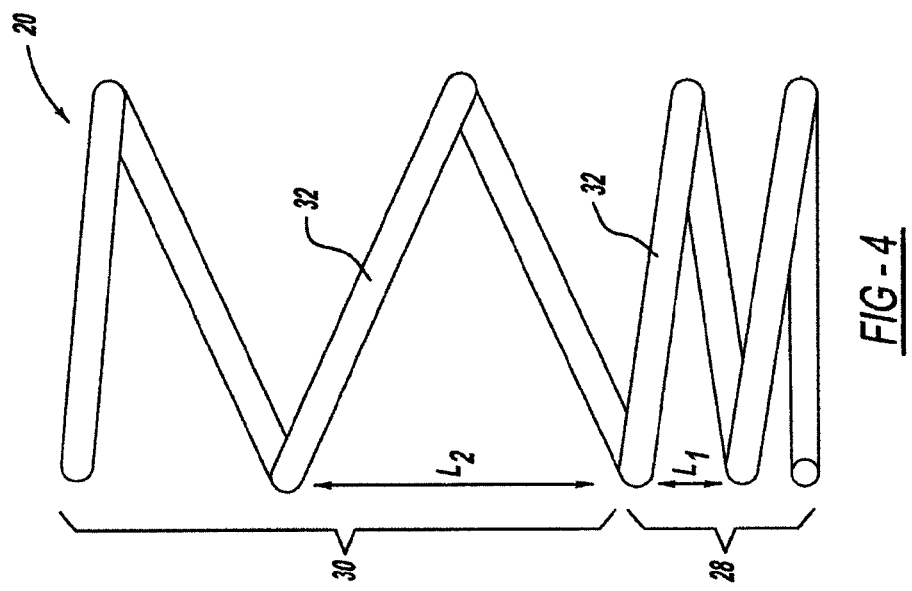

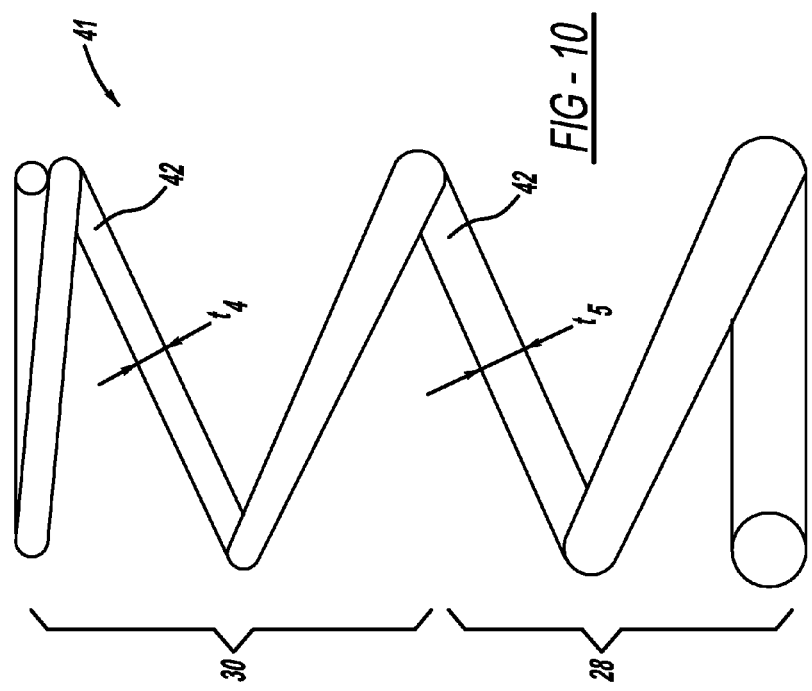
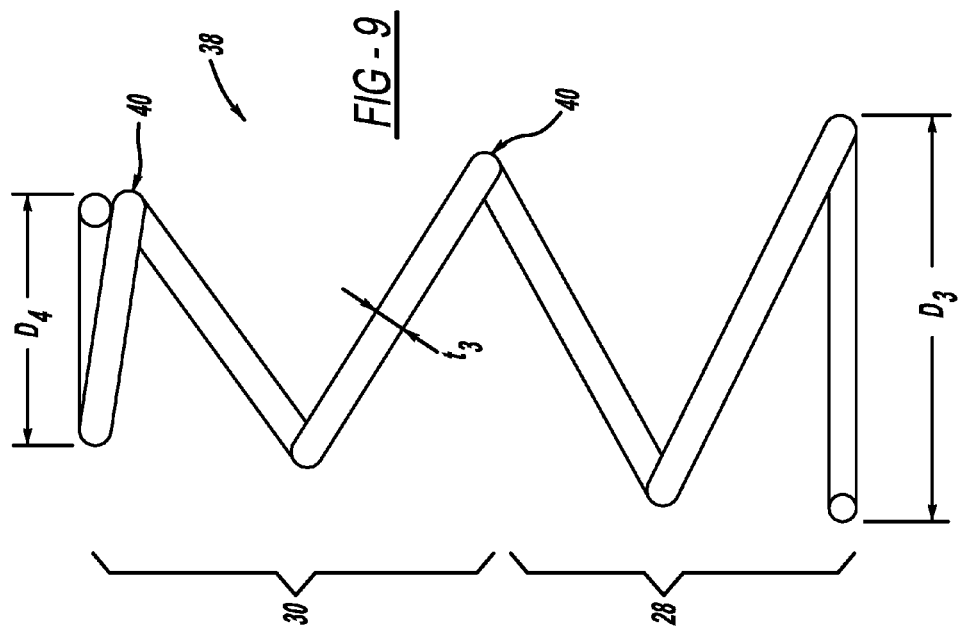

THREE-STAGE CONCENTRIC COIL SPRING SYSTEM

FIELD

The present invention relates to a coil spring system.

BACKGROUND

Vehicles such as trucks or heavy-duty trucks generally utilize a leaf spring suspension system that enables the vehicle to carry heavy loads. Leaf spring systems, however, do not necessarily provide a very smooth driving experience when the vehicle is carrying a small load, or no load at all. In this regard, any jounce experienced by the system is more readily applied to the vehicle frame, which results in a more bumpy ride for the driver. Vehicles such as sedans or the like, therefore, may utilize a spring suspension system that provides a softer ride for the driver. As these vehicles are rarely used to transport heavy loads, however, these spring suspension systems are not readily adaptable to a vehicle such as a truck. In this regard, when carrying heavy loads, the spring suspension system will compress before experiencing jounce from the road. Due to the pre-compression of the spring suspension before experiencing jounce, the spring suspension system is more apt to translate the jounce directly to the frame of the vehicle rather than more fully absorb the jounce. It is desirable, therefore, for a vehicle such as a truck to include a spring suspension system that provides a softer ride when carrying a load, not carrying a load, or carrying a small load.

SUMMARY

The present disclosure provides a spring system that includes at least an inner spring and an outer spring disposed around the inner spring. The inner spring exhibits a stiffness k1 and the outer spring exhibits a stiffness k2 in an uncompressed state. The inner spring exhibits a stiffness k3 and the outer spring exhibits the stiffness k2 in an intermediate compressed state, and the inner spring exhibits the stiffness k3 and the outer spring exhibits a stiffness k4 in a fully compressed state. In this manner, the spring system of the present disclosure may provide a vehicle with variable rates of compression that assist in providing a smooth ride at lower loads or jounce levels.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

BRIEF DESCRIPTION OF THE DRAWINGS

FIG. 4 is a perspective view of a first spring of the spring system according to a principle of the present disclosure;

FIG. 5 is a perspective view of a second spring of the spring system according to a principle of the present disclosure;

FIG. 9 is a perspective view of an alternative embodiment of the first or second spring according to a principle of the present disclosure; and FIG. 10 is a perspective view of another alternative embodiment of the first or second spring according to a principle of the present disclosure.

DETAILED DESCRIPTION

Disclosed herein is an exemplary spring system that utilizes at least a pair of springs that each have differing stiffnesses. As each spring of the spring system has differing stiffnesses, when the springs are compressed, the spring system provides multiple stages of differing stiffnesses based on a compression of each of the springs.

To provide the exemplary spring system with differing stiffnesses, each spring includes a first zone having a first stiffness, and a second zone having a second different stiffness. As the springs are each compressed, the differing stiffnesses of each spring collaborate to provide the multiple stages of differing stiffnesses. To provide the distinct zones of each spring having different stiffnesses, the spacing of the coils in each zone may be adjusted as desired, a thickness of the coils in each zone may be adjusted, or an outer diameter of the spring coils may be adjusted in each zone. An alternative exemplary embodiment includes a configuration where the material of the spring in each zone is different.

Figure 1:
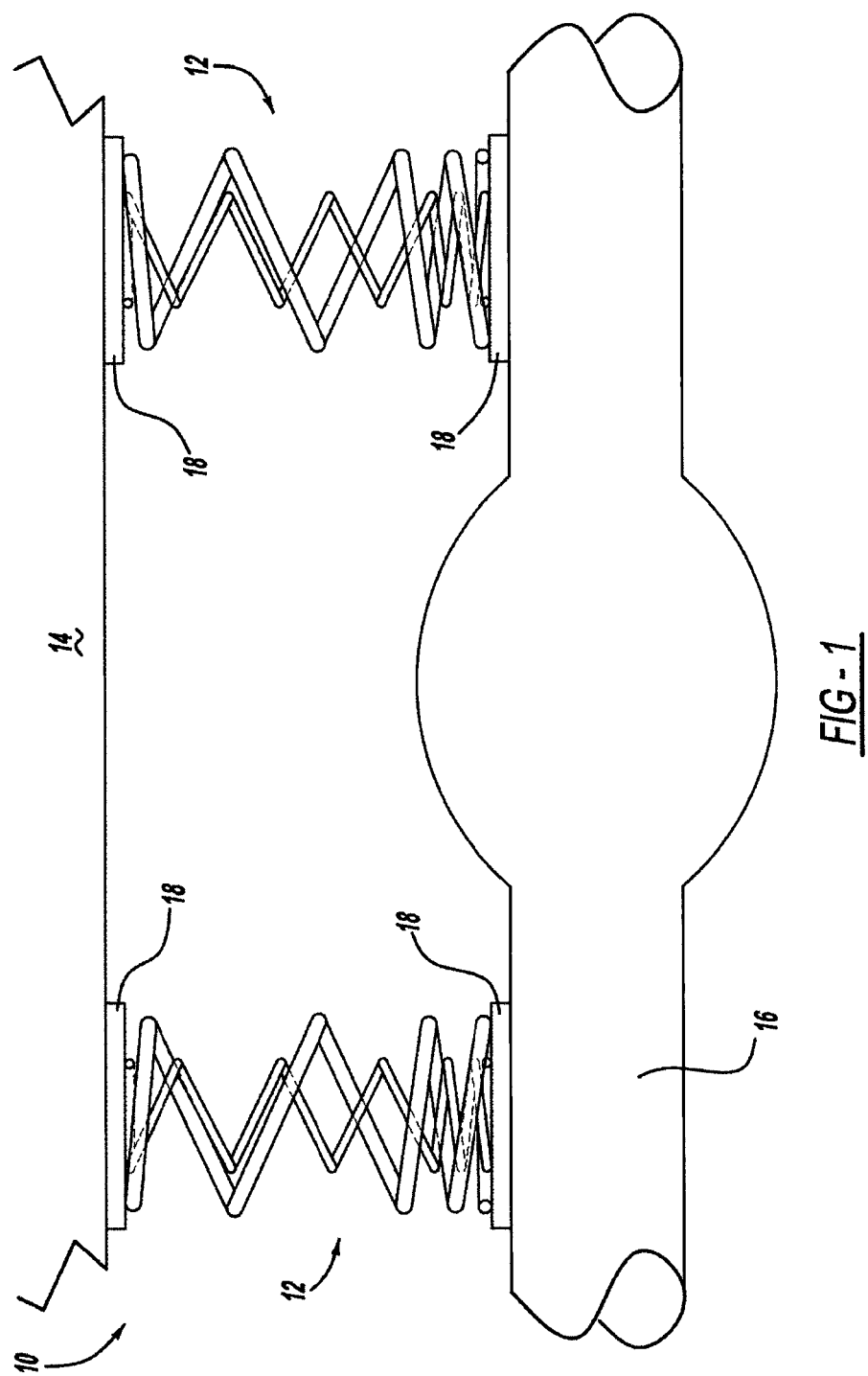
FIG. 1 is a schematic perspective view of a vehicle including a suspension system having a spring system according to a principle of the present disclosure.

FIG. 1 illustrates an exemplary suspension system 10 that may include a spring system 12 according to a principle of the present disclosure. Suspension system 10 may include a pair of spring systems 12 coupled between a vehicle frame 14 and a vehicle rear axle 16. Although suspension system 10 will be described relative to use on a heavy-duty vehicle such as a truck, it should be understood that the present disclosure should not be limited thereto. In particular, suspension system 10 and, more particularly, the exemplary spring system 12, may be used in a variety of vehicles or applications where multi-stage damping is required due to variations in loads that may be applied to spring system 12, without limitation.

Each spring system 12 of suspension system 10 may be directly coupled to each of vehicle frame 14 and rear axle 16 by welding or some other attachment method. Alternatively, as illustrated in FIG. 1, each spring system 12 may be coupled to vehicle frame 14 and rear axle 16 through use of mounting brackets 18. In this regard, brackets 18 may be coupled to vehicle frame 14 and rear axle 16 by welding or by fasteners (not shown).

Figure 2:
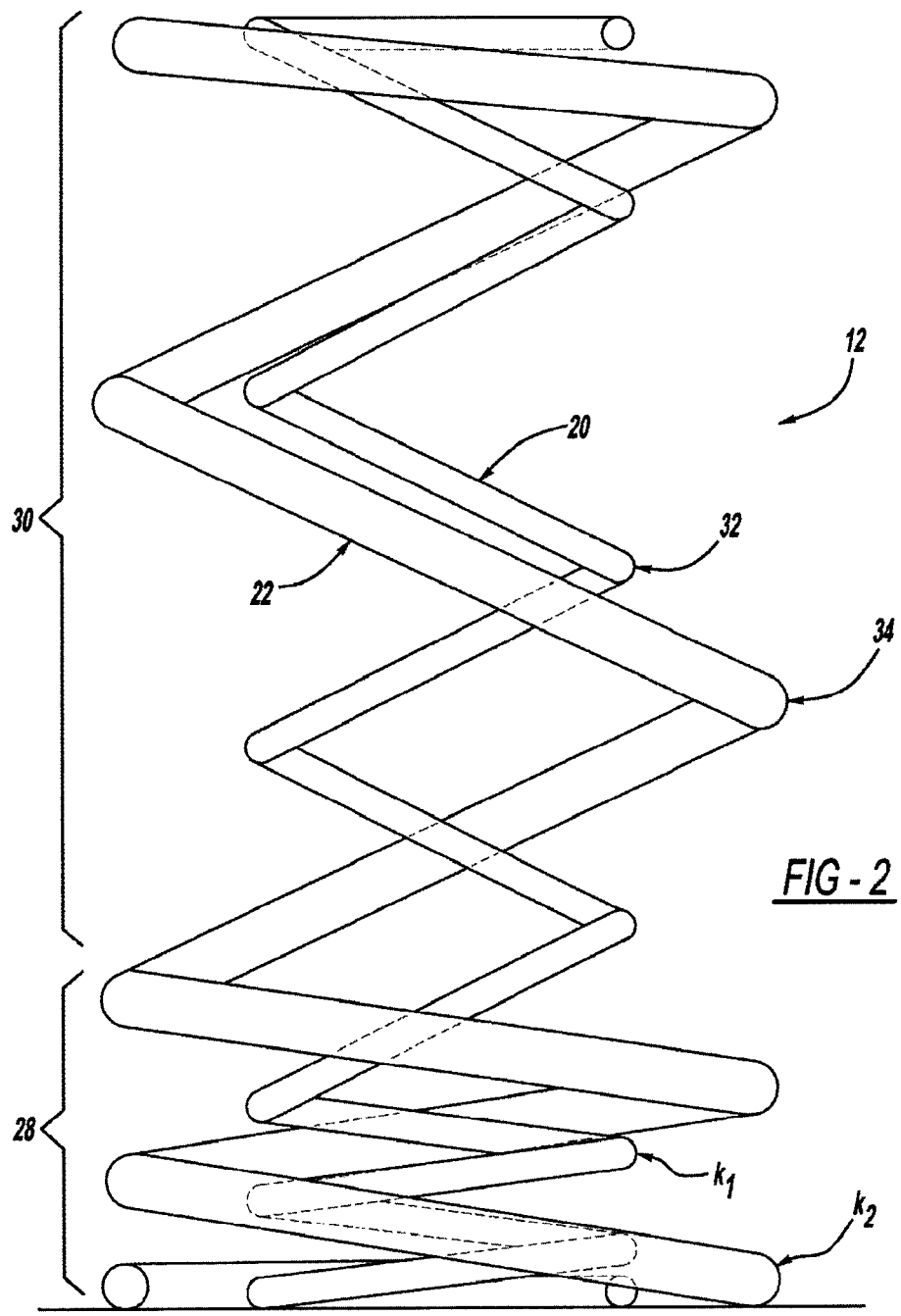
FIG. 2 is a perspective view of the spring system according to a principle of the present disclosure in an unloaded state.
Figure 3:
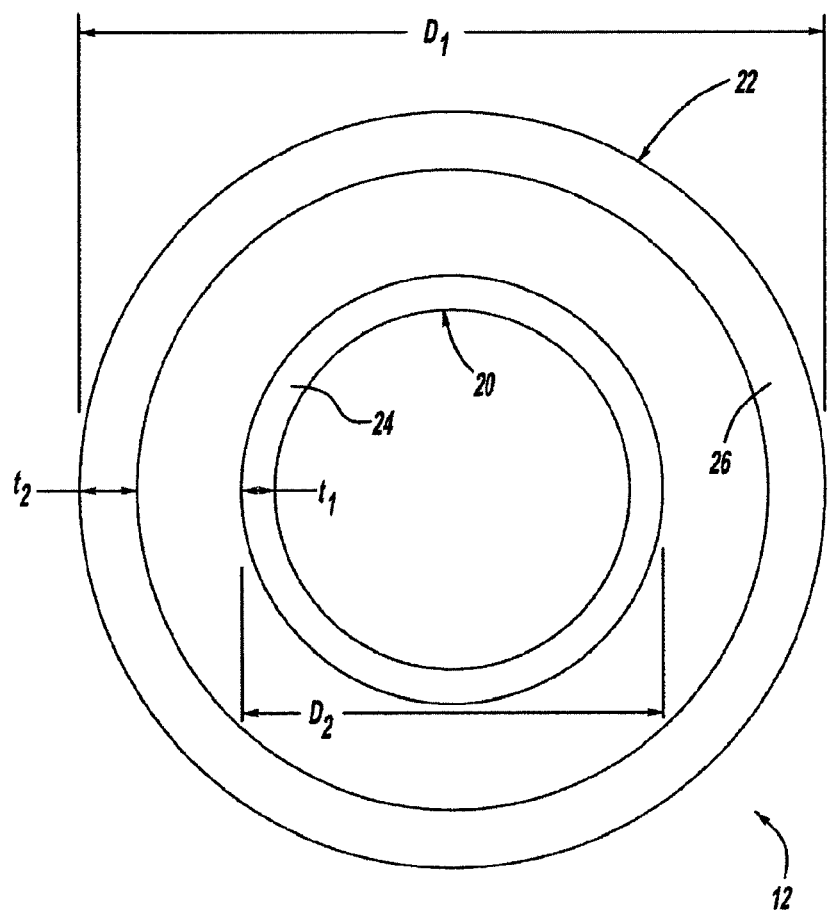
FIG. 3 is a plan view of the spring system illustrated in FIG. 2.

FIG. 2 illustrates an exemplary spring system 12 according to the present disclosure. Spring system 12 includes a first spring 20 and a second spring 22. First spring 20 is preferably concentric with second spring 22. That is, as best illustrated in FIG. 3, first spring 20 includes an outer diameter $D_2$ that is less than an outer diameter $D_1$ of second spring 22 such that first spring 20 may be entirely concentrically disposed within second spring 22. Although first spring 20 is preferably concentric with second spring 22 to reduce the space that spring system 10 occupies, first spring 20 is not necessarily limited to being concentric with second spring 22. In contrast, first spring 20 may be disposed adjacent second spring 22 without departing from the scope of the present disclosure.

First spring 20, in addition to having outer diameter $D_2$ that is less than outer diameter $D_1$ of second spring 22, may generally be formed of a wire 24 having a diameter or thickness $t_1$ that is less than a wire 26 having a diameter or thickness $t_2$ of second spring 22. Due to first spring 20 having an outer diameter $D_2$ and a wire diameter $t_1$ that are each less than both outer diameter $D_1$ and wire diameter $t_2$ of second spring 22, first spring 20 exhibits a lower stiffness than second spring 22. Accordingly, first spring 20 generally compresses to a greater extent than second spring 22 when experiencing jounce during operation of the vehicle, or when the vehicle is subjected to increased loads.

First spring 20 includes at least a first zone 28 and a second zone 30. As best illustrated in FIG. 4, in accordance with a first exemplary embodiment of the present disclosure, first spring 20 in first zone 28 includes coils 32 that are axially spaced a distance $L_1$. By axially spacing coils 32 at distance $L_1$, a stiffness of first spring 20 may be adjusted in first zone 28. First spring 20 in second zone 30 includes coils 32 that are axially spaced a distance $L_2$.

As illustrated in FIG. 4, $L_2$ is greater than $L_1$. By axially spacing coils 32 at distance $L_2$ that is greater than $L_1$, a stiffness of first spring 20 may be adjusted in second zone 30 to be greater than the stiffness of first zone 28. It should be understood that although first zone 28 is described as having a stiffness less than second zone 30, the present disclosure should not be limited to such a configuration. That is, the present disclosure contemplates a configuration where second zone 30 may have a stiffness less than first zone 28. Further, although first spring 20 is described as having first and second zones 28 and 30, first spring 20 may also have a configuration that includes additional zones having differing stiffness relative to the first and second zones 28 and 30.

FIG. 5 illustrates second spring 22. Similar to first spring 20, second spring 22 also includes first zone 28. First zone 28 of second spring 22 includes coils 34 that are axially spaced a distance $L_3$. By axially spacing coils 34 at distance $L_3$, a stiffness of second spring 22 may be adjusted in first zone 28. Second spring 22 in second zone 30 includes coils 34 that are axially spaced a distance $L_4$.

As illustrated in FIG. 5, $L_4$ is greater than $L_3$. By axially spacing coils 34 at distance $L_4$ that is greater than $L_3$, a stiffness of second spring 22 may be adjusted in second zone 30 to be greater the stiffness of first zone 28. It should be understood that although first zone 28 is described as having a stiffness less than second zone 30, the present disclosure should not be limited to such a configuration. That is, the present disclosure contemplates a configuration where second zone 30 may have a stiffness less than first zone 28. Further, although second spring 22 is described as having first and second zones 28 and 30, second spring 22 may also have a configuration that includes additional zones having differing stiffness relative to the first and second zones 28 and 30.

First spring 20 and second spring 22 each having first and second zones 28 and 30 of varying stiffness collaborate to provide spring system 12 with multiple stiffness during use thereof. Again referring to FIG. 2, spring system 12 is illustrated in a state of non-compression. That is, FIG. 2 illustrates spring system 12 when no load or jounce is applied thereto. In the state of non-compression, first spring 20 exhibits a stiffness $k_1$, while second spring 22 exhibits a stiffness $k_2$. Accordingly, the overall stiffness of spring system 12 in the state of non-compression may be expressed as $k_1+k_2=k_A$.

Figure 6:
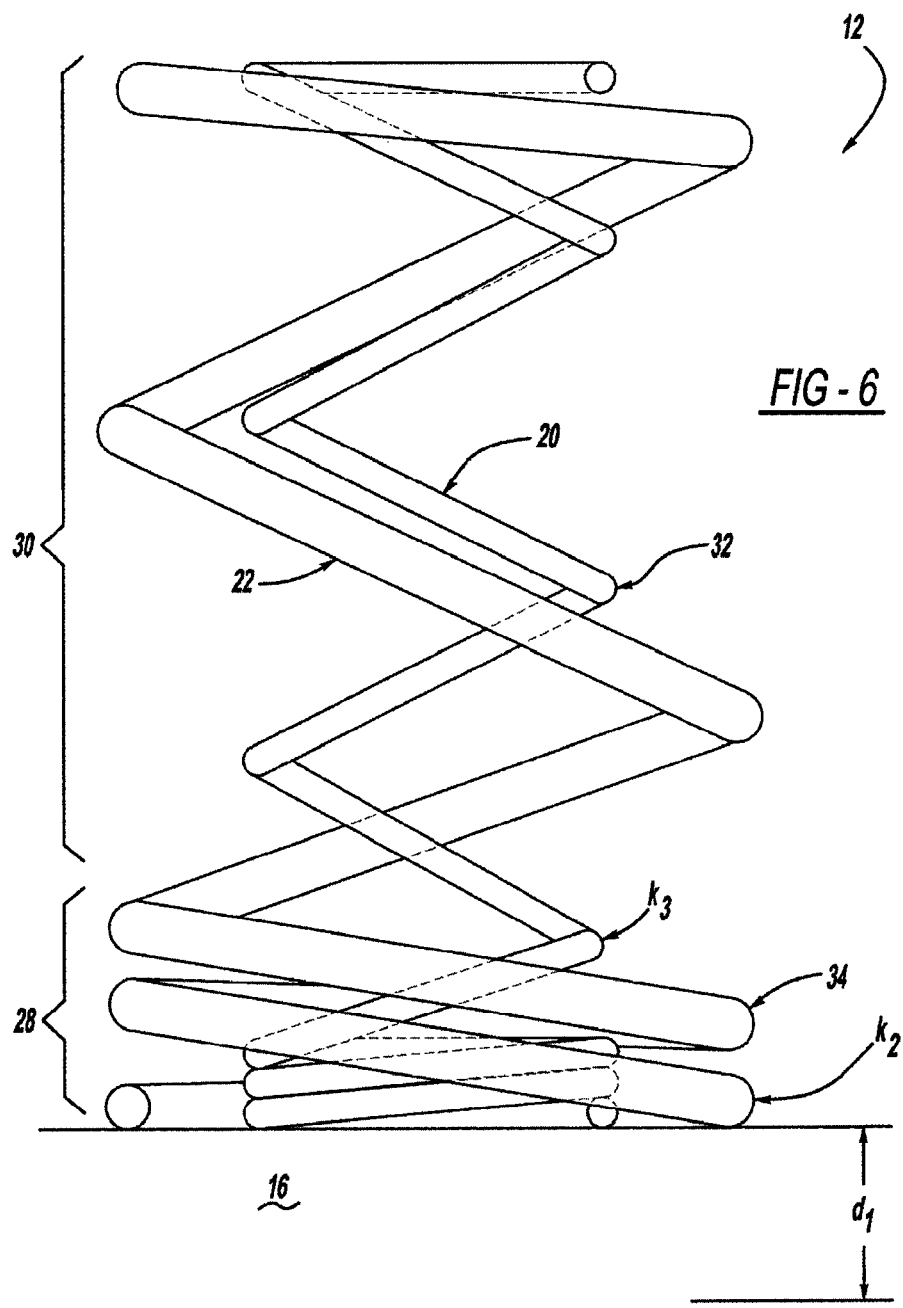
FIG. 6 is a perspective view of the spring system according to a principle of the present disclosure in an intermediately loaded state.

Now referring to FIG. 6, spring system 12 is subjected to a load or jounce that compresses spring system 12 a distance $d_1$. As illustrated in FIG. 6, coils 32 in first zone 28 have begun to fully compress, while coils 32 in second zone 30 have not fully compressed. Because coils 32 have begun to fully compress in first zone 28, first spring 20 will exhibit a stiffness $k_3$ rather than a stiffness $k_1$. That is, the first spring 20 will begin to exhibit a stiffness of the second zone 30 rather than a stiffness of the first zone 28. In contrast to first spring 20, coils 34 of second spring 22 in first zone 28 have not begun to fully compress at distance $d_1$. Second spring 22, therefore, still exhibits a stiffness $k_2$ (i.e., second spring 22 still exhibits a stiffness of first zone 28). Accordingly, the overall stiffness of spring system 12 in the state of intermediate-compression may be expressed as $k_2+k_3=k_B$.

Figure 7:
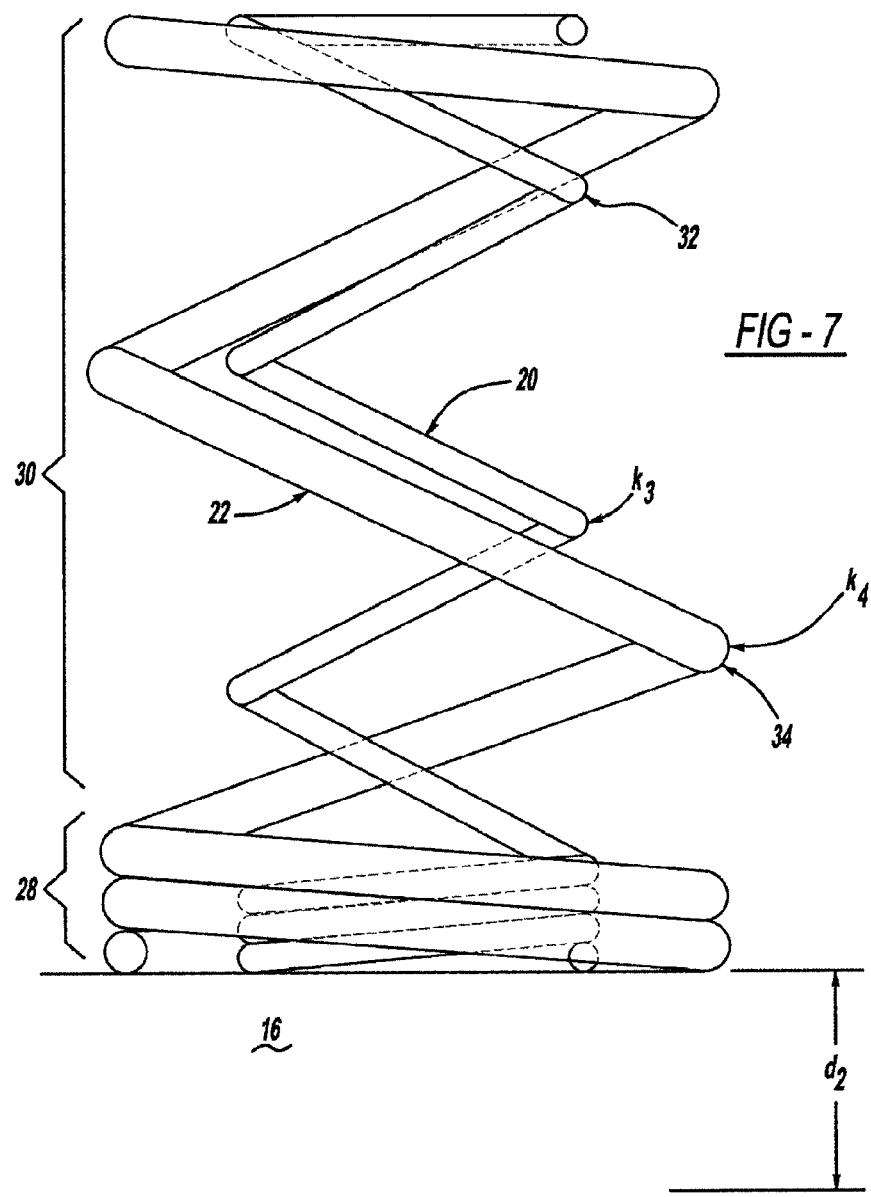
FIG. 7 is a perspective view of the spring system according to a principle of the present disclosure in a fully loaded state.

Now referring to FIG. 7, spring system 12 is subjected to a load or jounce that compresses spring system 12 a distance $d_2$. Distance $d_2$ represents a fully loaded condition. As illustrated in FIG. 7, coils 32 in first zone 28 have fully compressed, while coils 32 in second zone 30 have begun to compress. Because coils 32 have fully compressed in first zone 28, first spring 20 will exhibit a stiffness $k_3$ rather than a stiffness $k_1$. Coils 34 of second spring 22 in first zone 28 have also fully compressed at distance $d_2$. Second spring 22, therefore, will exhibit a stiffness $k_4$. That is, second spring 22 will exhibit a stiffness of second zone 30. Accordingly, the overall stiffness of spring system 12 in the state of full-compression and beyond may be expressed as $k_3+k_4=k_C$.

Figure 8:
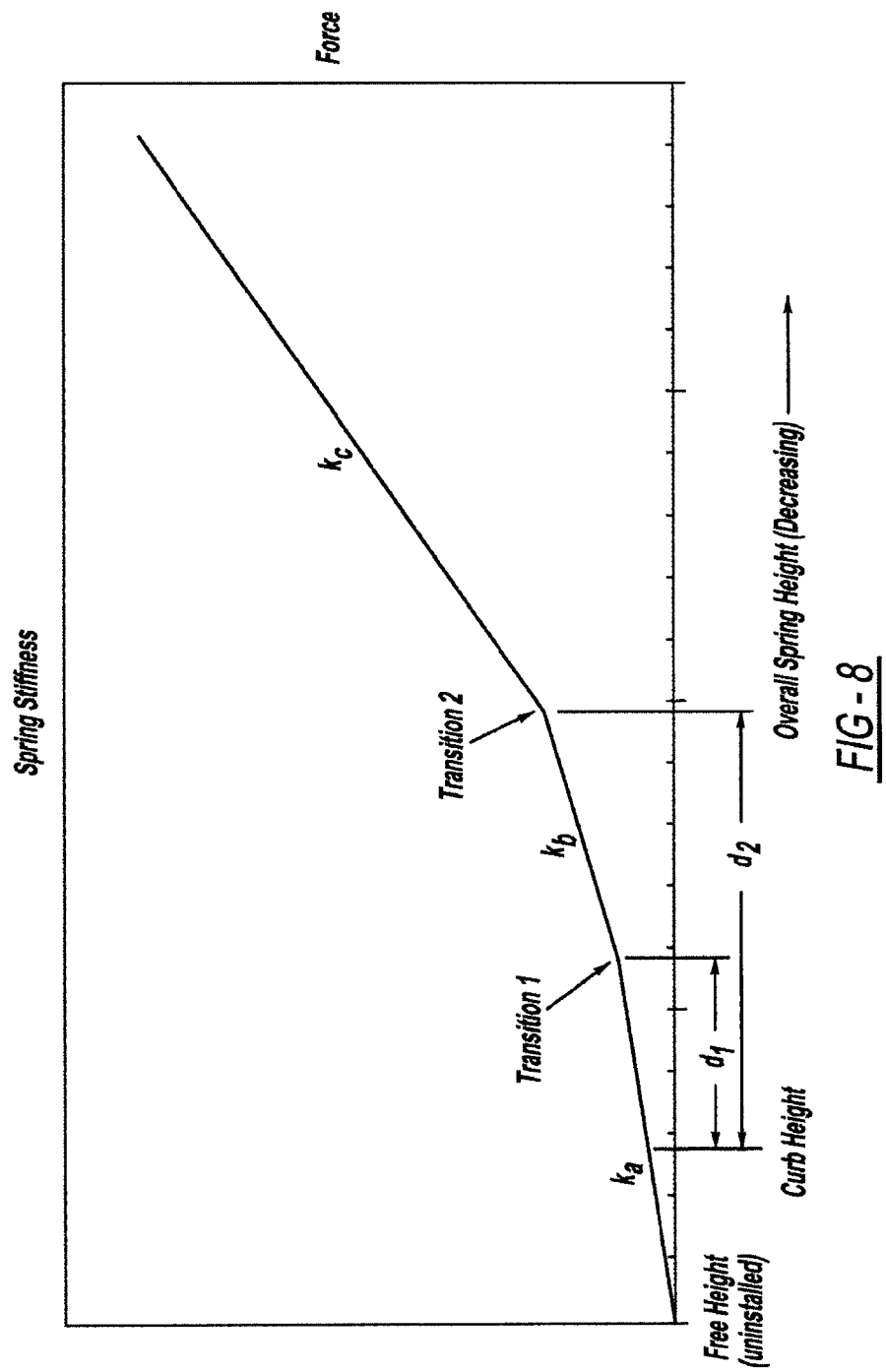
FIG. 8 is a graph illustrating a stiffness of the spring system according to the present disclosure as the spring system compresses.

According to the above, spring system 12 is capable of producing at least three states of stiffness $k_A$, $k_B$, and $k_C$. In general, spring system 12 is designed such that $k_C>k_B>k_A$. FIG. 8 illustrates a spring system 10 stiffness curve that shows the transitions between $k_A$, $k_B$, and $k_C$. By designing spring system 12 such that $k_C>k_B>k_A$, a vehicle having a suspension system 10 that includes spring system 12 is subjected to a softer ride at lower loads or smaller jounces. Such a system, therefore, is particularly advantageous for a vehicle such as a heavy-duty truck that typically includes a stiffer ride when a conventional suspension system such as a leaf spring suspension system is used.

First and second springs 20 and 22 may be formed to have additional zones of stiffness. For example, first and second springs 20 and 22 may each have three zones of stiffness, which would yield a spring system 12 capable of exhibiting at least six states of stiffness. Regardless, springs 20 and 22 may be formed to have as many zones of stiffness as desired.

First and second springs 20 and 22 are preferably formed from a material such as steel or spring steel. Other materials such as titanium or the like may also be used. Although not illustrated in the figures, it should be understood that coils 32 and 34 of first and second springs 20 and 22 in at least first zones 28 may be provided with a sleeve or coating to reduce noise or damage to the springs 20 and 22 during compression of first and second springs 20 and 22 in first zone 28. In this regard, the coating or sleeve may be formed of rubber or a polymeric material that prevents direct contact between adjacent coils 32 or 34.

FIG. 9 illustrates an alternative exemplary embodiment that may be applied to each of first spring 20 and second spring 22. Similar to first and second springs 20 and 22 illustrated in FIGS. 4 and 5, spring 38 includes a first zone 28 and a second zone 30. Instead of differing the spacing between coils 40 to adjust the stiffness of each zone 28 and 30, however, the coils 40 of each zone 28 and 30 of spring 38 have different outer diameters. More particularly, an outer diameter $D_3$ of coils 40 in first zone 28 of spring 38 may be greater than an outer diameter $D_4$ of coils 40 in second zone 30.

In other words, spring 38 narrows radially inward from first zone 28 to second zone 30. Such a configuration results in a greater stiffness in first zone 28 than in second zone 30. As spring system 12 utilizes a pair of springs, one skilled in the art would appreciate that simply increasing a thickness $t_3$ of wire 42 that forms spring 38 would be sufficient to increase the stiffness of an outer spring that surrounds or is used in tandem with an inner spring having a wire thickness that is less than the outer spring to achieve the multi-state stiffness of spring system 12 described above.

FIG. 10 illustrates yet another alternative exemplary embodiment that may also be applied to each of first spring 20 and second spring 22. Similar to the above exemplary embodiments, the spring 41 illustrated in FIG. 10 includes a first zone 28 and a second zone 30. To provide differing stiffness in first zone 28 and second zone 30, a thickness $t_5$ of wire 42 in first zone 28 is greater than a thickness $T_4$ of wire 42 in second zone 30. Such a configuration results in a greater stiffness in first zone 28 than in second zone 30. As spring system 12 utilizes a pair of springs, one skilled in the art would appreciate that simply increasing the thickness of the wire that forms an outer spring that surrounds or is used in tandem with an inner spring having a wire thickness that is less than the outer spring would be sufficient to achieve the multi-state stiffness of spring system 12 described above.

First spring 20 and second spring 22 may each be formed of different materials in first zone 28 and second zone 30 to provide the varying stiffness in each zone. For example, first zone 28 of each spring 20 and 22 may be formed of steel, while second zone 30 of each spring 20 and 22 may be formed of a material such as titanium. Other materials combinations are contemplated, without limitation. Regardless, so long as a different stiffness is present in each zone 28 and 30, first and second springs 20 and 22 may collaborate to provide spring system 12 with multiple stiffnesses as required.

Lastly, although the above exemplary embodiments have been described relative to a two-spring system 12, the present disclosure should not be limited thereto. More particularly, spring system 12 may be formed of more than two springs. For example, spring system 12 may include three or more springs each having zones of different stiffness, without limitation.

What is claimed is:

1. A spring suspension system for a vehicle comprising a first coil spring concentrically disposed within a second coil spring, each of the first and second coil springs including a first zone unitary with a second zone, the first zone having a different stiffness than the second zone such that during compression of the first and second coil springs, the spring suspension system will exhibit a first stiffness, a second stiffness, and a third stiffness,
    wherein the different stiffnesses of the first zone and the second zone are provided by differing a coil thickness in each of the first zone and the second zone.

2. The spring system of claim 1, wherein the stiffness of the first coil spring is less than the stiffness of the second coil spring.

3. The spring system of claim 1, wherein the first stiffness is less than the second stiffness, and the second stiffness is less than the third stiffness.

4. The spring system of claim 1, wherein the first coil spring exhibits a stiffness (k1) and the second coil spring exhibits a stiffness (k2) in an uncompressed state, the first coil spring exhibits a stiffness (k3) and the second coil spring exhibits the stiffness (k2) in an intermediate compressed state, and the first coil spring exhibits the stiffness (k3) and the second coil spring exhibits a stiffness (k4) in a fully compressed state.

5. The spring system of claim 4, wherein (k1)+(k2)=(kA), (k2)+(k3)=(kB), (k3)+(k4)=(kC), and (kA)<(kB)<(kC); and
    (kA), (kB), and (kC) are spring constants for the spring system in each of a non-compressed, an intermediate-compressed, and a full-compressed state, respectively.

6. The spring system of claim 4, wherein a difference in stiffness between (k1) and (k3) and a difference in stiffness between (k2) and (k4) is provided by each of the first and second coil springs having the first zone and the second zone that each exhibit the different stiffnesses.

* * * * *